United States Patent Office 3,489,513
Patented Jan. 13, 1970

3,489,513
RECOVERY OF MAGNESIUM VALUES FROM MAGNESIUM AND SULFATE CONTAINING AQUEOUS SALT SOLUTIONS
Lockwood W. Ferris, deceased, late of Salt Lake City, Utah, by Tracy Collins Bank and Trust Company, trustee, Salt Lake City, Utah, assignors to National Lead Company, New York, N.Y., a corporation of New Jersey
No Drawing. Filed Sept. 18, 1967, Ser. No. 668,714
Int. Cl. C01d 5/00; C01f 5/02
U.S. Cl. 23—121
1 Claim

ABSTRACT OF THE DISCLOSURE

Method of treating sulfate containing salt systems comprising double salts and salt admixtures of magnesium and an alkali metal, for separately recovering the magnesium and alkali metal values, which comprises: subjecting the same to heat treatment in a reducing atmosphere in the presence of moisture and carbon and at elevated temperature sufficient, i.e., about 500–900° C., and preferably 600–700° C., to form a solid calcinate containing magnesium oxide and a water soluble alkali metal sulfate, intimately contacting said calcinate with water to solubilize the alkali metal sulfate, and separating the solubilized sulfate from the magnesium oxide.

---

This invention pertains to the treatment of complex salts and salt solutions for separate recovery of particular salts. The invention pertains more especially to the treatment of salt mixtures and double salts containing magnesium, alkali metal and sulfate values for separation and recovery of the magnesium and alkali metal values in useable form.

In highly concentrated, naturally occurring, complex aqueous salt solutions such as are found in inland seas, salt lakes, salt wells and the like, sodium chloride is ordinarily the principal salt constitutent along with significant amounts of other alkali metal salts, such as potassium, lithium, etc., and also magnesium salts. Also, such solutions usually contain substantial amounts of the sulfate ion, and since magnesium and alkali metal sulfate are extremely water soluble, a serious problem is presented in separately recovering the magnesium and potassium values in particular in useable form, for example, potassium sulfate for use as a fertilizer and magnesium as the oxide MgO for pharmaceutical use and also for conversion with HCl to magnesium chloride for use in electrolysis cells for recovery of elemental magnesium metal.

When concentrated salt solutions from sources as aforesaid are subjected to concentration in successive stages, as for example by solar evaporation, sodium chloride is predominantly precipitated in the first stage or so, followed by precipitation of magnesium-potassium double salts, such as $K_2SO_4 \cdot MgSO_4 \cdot XH_2O$ or $$KCl \cdot MgSO_4 XH_2O$$

I have discovered in accordance with the present invention that such double salts or admixtures or solutions of the constituent salts thereof may be processed for separate recovery of the magnesium and alkali metal values, by subjection to a high temperature roast, preferably at about 600–700° C., in a reducing atmosphere and in the presence of steam and carbon. For example, starting with the magnesium-potassium double sulfate salt $K_2SO_4 \cdot MgSO_4 \cdot XH_2O$, the following equations depict the reactions occurring:

(1) $K_2SO_4 \cdot MgSO_4 \cdot XH_2O + 2C + H_2O$

$\downarrow$ Heat at 600–700° C.

$K_2S + MgSO_4 + 2CO_2 \uparrow + H_2O$

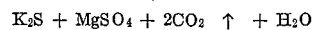

$\downarrow$ ditto $K_2SO_4 + MgS + H_2O$

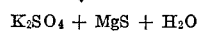

$\downarrow$ ditto $MgO + H_2S \uparrow + K_2SO_4$

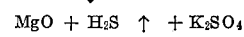

In practice, a water slurry of the salts together with an excess of carbon above the stoichiometric amount required by the above reactions is fed to a roaster preheated to about 600–700° C., along with a flow of steam which is continued beyond the point of $H_2S$ evolution. Water extraction of the roaster calcinate separates the MgO precipitate, while $K_2SO_4$ is recovered by evaporation of the leach filtrate.

The invention is applicable to the treatment of such double salts as picromerite or schoenite, $$K_2SO_4 \cdot MgSO_4 \cdot 6H_2O$$

leonite $K_2SO_4 \cdot MgSO_4 \cdot 4H_2O$; langbenite $K_2SO_4 \cdot 2MgSO_4$; kainite $MgSO_4 \cdot KCl \cdot 3H_2O$, etc. The invention is also applicable to the corresponding salts wherein sodium is substituted for potassium. It will be observed that all such salts are sulfate containing, and are double salts of magnesium and an alkai metal.

In the case of kanite, $MgSO_4 \cdot KCl \cdot 3H_2O$, a high temperature roast, at about 600–700° C., in the presence of steam alone, as described in applicant's co-pending application Ser. No. 400,994 filed Oct. 2, 1964, now Patent No. 3,432,258, produces magnesium oxide, hydrochloric acid and an equimolar mixture of magnesium sulfate and potassium sulfate. The kainite crystal, as shown by the above formula, contains equal numbers of magnesium and potassium ions, but on decomposition, two potassium ions are required for each magnesium ion. As a result, only half of the available magnesium is converted to the oxide and the remaining half remains as magnesium sulfate. Additional treatment by the carbon roast of the present invention produces additional magnesium oxide, equal in amount to that produced by the kainite roast. The reactions of the two roasting operations are as follows:

Kainite roast:

$2MgSO_4 \cdot KCl \cdot 3H_2O \rightarrow MgO + 2HCl$
$+ 5H_2O + K_2SO_4 + MgSO_4$ Carbon roast:

$K_2SO_4 + MgSO_4 + 2C + H_2O \rightarrow MgO \times 2CO_2 + K_2SO_4 + H_2S$

It will thus be seen that as a result of the successive roasting operations, all of the magnesium values are recovered as magnesium oxide and all of the potassium values as potassium sulfate.

Considering the practice of the invention somewhat more in detail, a water slurry of the salts to be treated is fed, preferably together with a carbon, into a roaster preferably preheated to the desired elevated temperature. A moderate flow of steam is also provided to supply the vehicle for the reaction and to aid in the handling of the material. The roasting process is carried out at a temperature sufficient to form the magnesium oxide in the presence of the reducing carbon. This temperature is suitably in the range of 500–900° C. and preferably of from 600–700° C. Temperatures on the high side of the range and above may tend to cause some fusion of various salts and for that reason are preferably avoided. Temperatures within the recited range are additionally preferred since they result in a deactivated form of magnesium oxide, that is, one which is relatively unreactive with water and is therefore easy to wash and filter. The atmosphere of the reaction system is desirably non-oxidizing to avoid any side conversion of carbon to carbon oxides which is not the result of the desired reduction of the magnesium sulfate.

By non-oxidizing, is meant those conditions wherein the salt system constitutes the major source of materials to be reduced. This is for the reason that economic utilization of carbon dictates that as little oxygen or other oxidizing media as possible enter from external sources thereby to avoid oxidation of the carbon to carbon oxides by materials other than the magnesium sulfate.

As for the carbon itself, this may be introduced in any convenient manner considered with the operation of the particular roasting apparatus. It is normally preferred to use the carbon in the form of suspended particles in the water slurry of the salts to be treated. It is also possible, however, to introduce the carbon particles in the form of a blown stream or jet together with the steam, the spray of salt slurry, or independently of either of these provided intimate contact between the carbon and the salt is achieved in the roasting operation. Concurrent introduction of the reducing carbon intimately blended with the salt slurry and fed as a mixture thereof is preferred.

With regard to particle size, suitable results are obtained when finely divided activated carbon comparable to that used in decolorizing applications is suitable. Sizes ranging up to about 25 mesh are suitable. As for the amount to be used, it is preferred that the stoichiometric amount be utilized to allow the reaction to be as complete as possible. In practice, a slight excess of carbon rather than of salt is preferred since this can be carried through into the magnesium oxide filter cake and may be easily removed upon subsequent conversion of the oxide to magnesium chloride. Alternately, or further when it is desired not to convert to the chloride, the carbon-magnesium oxide roast residue can be reroasted in an oxidizing atmosphere for an additional period of time after the main reaction to convert the excess carbon to the carbon oxides.

The salt feed material is allowed to remain at the elevated temperature for periods of time which may vary, depending upon the particular temperatures employed and the constituents of the salt material. In any event, it is preferred that the reaction go as nearly complete as possible as will be evidenced by the cessation of hydrogen sulfide evolution. The evolved gases obtained as a result of the pyrolysis, i.e., the hydrogen sulfide and carbon dioxide together with the steam are directed out of the equipment and used as desired.

The roaster residue after completion of the reaction is then intimately contacted with water so as to solubilize the soluble potassium sulfate and remove it from involvement with the water insoluble magnesium oxide. Ordinarily, this may be achieved by taking up the residue in a relatively large amount of water and agitating the slurry for a period of time. Quantities of water ranging of from 5 to 20 times the weight of the calcinate are ordinarily sufficient for this purpose and agitation for periods of one half hour or more are suitable. The insoluble magnesium oxide thus obtained is then separated from the leaching water mass and washed with additional quantities of water and dried as desired. The separated filtrate contains the solubilized potassium sulfate and is then available for use as desired. In some instances, it is desirable to subdivide or comminute the calcinate agglomerate as by grinding for example, to insure maximum exposure thereof to the water upon subsequent contact therewith. Particle sizes of about 5 mesh and smaller are suitable.

A further aspect of the invention involves using kainite itself as a starting material where the individual processing can tolerate a mixed gas stream as a product of the roast. For example, the normal pyrolysis of kainite, as indicated above, results in the evolution of hydrogen chloride, whereas the reduction of the instant invention yields gaseous $H_2S$ and $CO_2$ products. When the kainite is directly roasted in the presence of the reducing carbon according to the process of the invention, a mixture of gaseous oxidation-reduction products is obtained. The magnesium sulfate is converted to the oxide and the potassium chloride is converted to the sulfate. This is then recovered in the water washes, as indicated above. Thus, although the original double salt contains no alkali metal sulfate, the potassium chloride content is utilized as a salt which under the reaction conditions yields potassium sulfate. The advantage then is that only one operation is needed to convert the magnesium sulfate to the oxide and effect the separation thereof from the potassium salt moiety of the double salt.

What is claimed is:

1. The method of treating the double salt kainite, $MgSO_4 \cdot KCl \cdot 3H_2O$, for recovery of $K_2SO_4$ and MgO which comprises: heating said salt in the presence of steam and a carbonaceous reducing agent at about 600–700° C. until a calcinate is obtained consisting of $K_2SO_4$ and MgO, water slurrying said calcinate to dissolve the $K_2SO_4$, separating the MgO precipitate and concentrating the resulting solution to precipitate $K_2SO_4$.

References Cited

UNITED STATES PATENTS 2,903,336　9/1959　Gloss et al. _____ 23—224 X

FOREIGN PATENTS 1,303　1781　Great Britain.
1,369　1783　Great Britain.

OTHER REFERENCES

Mellor: A Comprehensive Treatise on Theoretical and Inorganic Chemistry, vol. 2, Longmans, Green & Co., New York, London; 1922, pp. 658–60.

Chemical Abstracts, vol. 18, p. 2946, 1924.
Chemical Abstracts, vol. 33, p. 9559, 1933.

OSCAR R. VERTIZ, Primary Examiner

G. O. PETERS, Assistant Examiner

U.S. Cl. X.R.

23—201